(12) United States Patent
Tamura

(10) Patent No.: US 7,844,704 B2
(45) Date of Patent: Nov. 30, 2010

(54) EVENT NOTIFICATION DEVICE AND EVENT NOTIFICATION METHOD

(75) Inventor: Hiroshi Tamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 12/044,773

(22) Filed: Mar. 7, 2008

(65) Prior Publication Data
US 2008/0228915 A1 Sep. 18, 2008

(30) Foreign Application Priority Data
Mar. 16, 2007 (JP) ............................. 2007-068784

(51) Int. Cl.
*G06F 15/177* (2006.01)
(52) U.S. Cl. ..................... 709/224; 709/226; 709/223
(58) Field of Classification Search ................. 709/224, 709/223, 226
See application file for complete search history.

(56) References Cited

U.S. PATENT DOCUMENTS

| | | | | |
|---|---|---|---|---|
| 7,483,438 B2 * | 1/2009 | Serghi et al. ................. | 370/401 |
| 7,676,562 B2 * | 3/2010 | Reistad et al. ............... | 709/223 |
| 7,737,826 B2 * | 6/2010 | Tamura .................. | 340/286.02 |
| 2005/0182843 A1 * | 8/2005 | Reistad et al. ............... | 709/230 |
| 2006/0235973 A1 * | 10/2006 | McBride et al. ............. | 709/226 |
| 2007/0162567 A1 * | 7/2007 | Ding ........................... | 709/219 |
| 2008/0061960 A1 * | 3/2008 | Tamura .................. | 340/539.11 |

FOREIGN PATENT DOCUMENTS

| | | |
|---|---|---|
| JP | 2001-282471 | 10/2001 |
| JP | 2005-4326 | 1/2005 |
| JP | 2005-84891 | 3/2005 |
| JP | 2006-72568 | 3/2006 |

\* cited by examiner

*Primary Examiner*—Kenneth R Coulter
(74) *Attorney, Agent, or Firm*—Cooper & Dunham LLP

(57) ABSTRACT

An event notification device notifies event information via a network. A storage unit stores therein event-transmission determination information. An event monitoring monitors whether an event occurs. A determining unit determines based on the event-transmission determination information whether event information of occurred event is to be transmitted to only a target communication device from among communication devices that have requested to be notified of the event information. An event notifying unit notifies the target communication device or all the communication devices of the event information by using the WS-Eventing protocol according to a result of the determination.

8 Claims, 14 Drawing Sheets

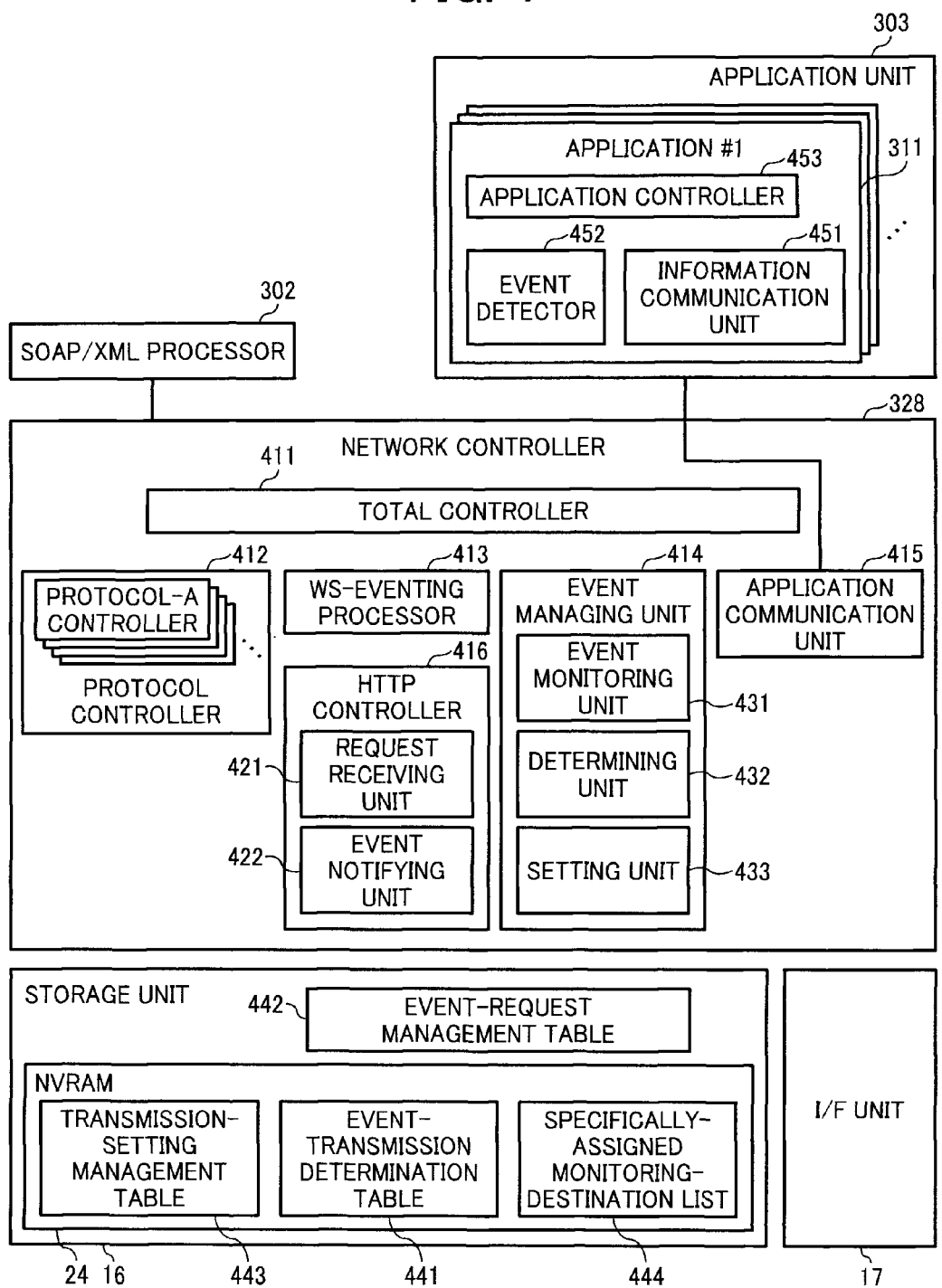

FIG. 5

| IP ADDRESS OF EVENT-REQUEST SENDER | TYPE OF EVENT | SUBSCRIBE ID |
|---|---|---|
| 192.168.1.5 | PrinterStatus | uuid:f34d5678...... |
| 192.168.1.5 | MachineStatus | uuid:01234567...... |
| 192.168.1.5 | MachineConfiguration | uuid:98765432...... |
| 192.168.1.5 | PrinterJobStatus | uuid:adbdf983...... |
| 192.168.1.3 | PrinterStatus | uuid:1234abcd...... |
| 192.168.1.3 | MachineStatus | uuid:deac7654...... |
| 192.168.1.3 | MachineConfiguration | uuid:66665555...... |
| 192.168.1.3 | PrinterJobStatus | uuid:2a3d4c6b...... |
| fe08::214:51ff:fe22:3344 | ScannerStatus | uuid:a1b4d7c0...... |
| fe08::214:51ff:fe22:3344 | PrinterStatus | uuid:eeffbb33...... |
| fe08::214:51ff:fe22:3344 | MachineStatus | uuid:9988aa66...... |
| fe08::214:51ff:fe22:3344 | MachineConfiguration | uuid:cc5566dd...... |
| fe08::214:51ff:fe22:3344 | ScannerJobStatus | uuid:11223344...... |
| fe08::214:51ff:fe22:3344 | PrinterJobStatus | uuid:eeddfacb...... |
| : | : | : |

FIG. 6

| DESTINATION TO BE NOTIFIED (ALL MONITORING DESTINATIONS OR SPECIFIC MONITORING DESTINATION) | CHECKING OF NUMBER OF REQUESTS | NUMBER OF REQUESTS | TRANSMIT TO SPECIFICALLY-ASSIGNED MONITORING DESTINATION WITHOUT EXCEPTION |
|---|---|---|---|
| SPECIFIC MONITORING DESTINATION | REQUIRED | 20 | YES |

FIG. 7

| TYPE OF EVENT | DESTINATION |
|---|---|
| PrinterStatus | ALL MONITORING DESTINATIONS |
| ScannerStatus | ALL MONITORING DESTINATIONS |
| MachineStatus | SPECIFIC MONITORING DESTINATION (192.168.2.56) |
| PrinterJobStatus | SPECIFIC MONITORING DESTINATION (CLIENT THAT SENDS JOB REQUEST) |
| ScannerJobStatus | SPECIFIC MONITORING DESTINATION (CLIENT THAT SENDS JOB REQUEST) |
| MachineConfiguration | ALL MONITORING DESTINATIONS |

FIG. 8

| IP ADDRESS |
|---|
| 192.168.1.5 |
| 192.168.2/24 |
| fe08::214:51ff:fe22:3344 |
| 2023:0246:4adf/48 |

FIG. 9

```
<s12:Envelope
   xmlns:s12='http://www.w3.org/2003/05/soap-envelope'
   xmlns:wsa='http://schemas.xmlsoap.org/ws/2004/08/addressing'
   xmlns:wse='http://schemas.xmlsoap.org/ws/2004/08/eventing' >
  <s12:Header>
    <wsa:Action>
      http://schemas.xmlsoap.org/ws/2004/08/eventing/Subscribe                 ~~~~ 901
    </wsa:Action>
    <wsa:MessageID>
      uuid:e1886c5c-5e86-48d1-8c77-fc1c28d47180
    </wsa:MessageID>
    <wsa:ReplyTo>
      <wsa:Address>http://www.example.com/MyEvEntsink</wsa:Address>
    </wsa:ReplyTo>
    <wsa:To>http://www.example.org/mfp-check/EventSource</wsa:To>
  </s12:Header>
  <s12:Body>
    <wse:Subscribe>
      <wse:EndTo>
        <wsa:Address>
          http://www.example.com/MyEventSink
        </wsa:Address>
      </wse:EndTo>
      <wse:Delivery>
        <wse:NotifyTo>
          <wsa:Address>
            http://www.example.com/MyEventSink
          </wsa:Address>
        </wse:NotifyTo>
      </wse:Delivery>
      <wse:Expires>PT30M</wse:Expires>
      <wse:Filter xmlns:mfp='http://www.example.org/mfp'
        Dialect='http://www.example.org/mfp-check/PrinterStatusEvent' >        ~~~ 902
      </wse:Filter>
    </wse:Subscribe>
  </s12:Body>
</s12:Envelope>
```

FIG. 10

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
 <s12:Header>
  <wsa:Action>
    http://schemas.xmlsoap.org/ws/2004/08/eventing/SubscribeResponse            ~--1001
  </wsa:Action>
  <wsa:RelatesTo>
     uuid:e1886c5c-5e86-48d1-8c77-fc1c28d47180
  </wsa:RelatesTo>
  <wsa:To>http://www.example.com/MyEventSink</wsa:To>
 </s12:Header>
 <s12:Body>
  <wse:SubscribeResponse>
    <wse:SubscriptionManager>
     <wsa:Address>
        http://www.example.org/mfp-check/SubscriptionManager
     </wsa:Address>
     <wsa:ReferenceParameters>
       <wse:Identifier>
         uuid:22e8a584-0d18-4228-b2a8-3716fa2097fa
       </wse:Identifier>
     </wsa:ReferenceParameters>
    </wse:SubscriptionManager>
    <wse:Expires>PT30M</wse:Expires>
  </wse:SubscribeResponse>
 </s12:Body>
</s12:Envelope>
```

FIG. 11

```
<s12:Envelope
  xmlns:s12='http://www.w3.org/2003/05/soap-envelope'
  xmlns:wsa='http://schemas.xmlsoap.org/ws/2004/08/addressing'
  xmlns:wse='http://schemas.xmlsoap.org/ws/2004/08/eventing' >
<s12:Header>
 <wsa:Action>
   http://schemas.xmlsoap.org/ws/2004/08/eventing/Subscribe                -1101
 </wsa:Action>
 <wsa:MessageID>
    uuid:e1886c5c-5e86-48d1-8c77-fc1c28d47180
 </wsa:MessageID>
 <wsa:ReplyTo>
  <wsa:Address>http://www.example.com/MyEvEntsink</wsa:Address>
 </wsa:ReplyTo>
 <wsa:To>http://www.example.org/mfp-check/EventSource</wsa:To>
</s12:Header>
<s12:Body>
 <wse:Subscribe>
  <wse:EndTo>
   <wsa:Address>
    http://www.example.com/MyEventSink
   </wsa:Address>
  </wse:EndTo>
  <wse:Delivery>
   <wse:NotifyTo>
    <wsa:Address>
     http://www.example.com/MyEventSink
    </wsa:Address>
   </wse:NotifyTo>
  </wse:Delivery>
  <wse:Expires>PT30M</wse:Expires>
  <wse:Filter xmlns:mfp='http://www.example.org/mfp'
   Dialect='http://www.example.org/mfp-check/PrinterJobStatusEvent' >     --1102
  </wse:Filter>
 </wse:Subscribe>
</s12:Body>
</s12:Envelope>
```

FIG. 12

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
1201      http://schemas.xmlsoap.org/ws/2004/08/eventing/Renew
    </wsa:Action>
    <wsa:MessageID>
        uuid:bd88b3df-5db4-4392-9621-aee9160721f6
    </wsa:MessageID>
    <wsa:ReplyTo>
      <wsa:Address>http://www.example.com/MyEventSink</wsa:Address>
    </wsa:ReplyTo>
    <wsa:To>
        http://www.example.org/mfp-check/SubscriptionManager
    </wsa:To>
    <wse:Identifier>
        uuid:22e8a584-0d18-4228-b2a8-3716fa2097fa
    </wse:Identifier>
  </s12:Header>
  <s12:Body>
    <wse:Renew>
      <wse:Expires>PT30M</wse:Expires>
    </wse:Renew>
  </s12:Body>
</s12:Envelope>
```

FIG. 13

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
1301      http://schemas.xmlsoap.org/ws/2004/08/eventing/RenewResponse
    </wsa:Action>
    <wsa:RelatesTo>
        uuid:bd88b3df-5db4-4392-9621-aee9160721f6
    </wsa:RelatesTo>
    <wsa:To>http://www.example.com/MyEventSink</wsa:To>
  </s12:Header>
  <s12:Body>
    <wse:RenewResponse>
1302      <wse:Expires>PT30M</wse:Expires>
    </wse:RenewResponse>
  </s12:Body>
</s12:Envelope>
```

FIG. 14

```
<s12:Envelope
    xmlns:s12='http://www.w3.org/2003/05/soap-envelope'
    xmlns:wsa='http://schemas.xmlsoap.org/ws/2004/08/addressing'
    xmlns:mfp='http://www.example.org/mfp' >
  <s12:Header>
    <wsa:Action>
      http://www.example.org/mfp-check/PrinterStatusEventReport      ← 1401
    </wsa:Action>
    <wsa:MessageID>
      uuid:568b4ff2-5bc1-4512-957c-0fa545fd8d7f
    </wsa:MessageID>
    <wsa:To>http://www.example.com/MyEventSink</wsa:To>
  </s12:Header>
  <s12:Body>
    <mfp:PrinterStatusEventReport>
    <mfp:Date>20061030</mfp:Date>
    <mfp:Time>1158</mfp:Time>
    <mfp:State>Out of Toner</mfp:State>      ← 1402
    <mfp:Comments>
      Please clear this status.
    </mfp:Comments>
    </mfp:StatusEventReport>
  </s12:Body>
</s12:Envelope>
```

FIG. 15

```
<s12:Envelope
    xmlns:s12='http://www.w3.org/2003/05/soap-envelope'
    xmlns:wsa='http://schemas.xmlsoap.org/ws/2004/08/addressing'
    xmlns:mfp='http://www.example.org/mfp' >
  <s12:Header>
    <wsa:Action>
      http://www.example.org/mfp-check/PrinterJobStatusEventReport   ← 1501
    </wsa:Action>
    <wsa:MessageID>
      uuid:568b4ff2-5bc1-4512-957c-0fa545fd8d7f
    </wsa:MessageID>
    <wsa:To>http://www.example.com/MyEventSink</wsa:To>
  </s12:Header>
  <s12:Body>
    <mfp:JobStatusEventReport>
    <mfp:Date>20061031</mfp:Date>
    <mfp:Time>1158</mfp:Time>
    <mfp:State>Job Completed</mfp:State>     ← 1502
    <mfp:NumberOfPapers>23</mfp:NumberOfPapers>
    <mfp:Comments>
      Printing Successfully Done.
    </mfp:Comments>
    </mfp:StatusEventReport>
  </s12:Body>
</s12:Envelope>
```

EVENT NOTIFICATION DEVICE AND EVENT NOTIFICATION METHOD

CROSS-REFERENCE TO RELATED APPLICATIONS

The present application claims priority to and incorporates by reference the entire contents of Japanese priority document 2007-068784 filed in Japan on Mar. 16, 2007.

BACKGROUND

1. Technical Field

This disclosure relates to a technology for notifying information about an event occurring in one device to other devices.

2. Description of the Related Art

Network multifunction peripherals, such as printers, are known in the art that can receive operation instructions from other devices (users) via a network, such as the Internet or Intranet. When an event occurs in such an MFP, it notifies information about the event to all of its users. As a result, the users can grasp the content of the event and execute appropriate operations. Such events generally relate to the hardware or software conditions in the MFP.

When many users share a certain specific image processing device, the content of the occurred event is simultaneously notified to all the users. Therefore, when the number of users who request the transmission of the event increases, it takes longer time to notify all the users of occurrence of an event.

However, depending on the type of the event, the content of the event does not need to be transmitted to all event monitoring destinations. As a technique for setting an event (job) to be notified, there is a technique described in Japanese Patent Application Laid-open No. 2006-72568. According to the technique described in Japanese Patent Application Laid-open No. 2006-72568, the event is set to a driver at a user's side, thereby making it possible to set the job to be notified.

However, according to the technique described in Japanese Patent Application Laid-open No. 2006-72568, the event is set to a user's driver, and is not notified to a device to which the event is to be notified. That is, the technique described in Japanese Patent Application Laid-open No. 2006-72568 changes the event to be notified, according to a request of the user, and does not solve the problem that more time is required to perform the notification.

BRIEF SUMMARY

According to an aspect of this disclosure, there is provided an event notification device connected to a plurality of communication devices via a network. The event notification device includes a first storage unit that stores therein event-transmission determination information including event-type information related to transmission determination information, wherein the event-type information indicates a type of an event, and the transmission determination information indicates whether event information indicative of information about an event is to be transmitted to only at least one target communication device from among communication devices that have requested via the network to be notified of the event information; an event monitoring unit that monitors whether an event occurs; a determining unit that determines, when the event monitoring unit detects occurrence of an event, whether event information of occurred event is to be transmitted to only the target communication device based on the event-transmission determination information by using event-type information of the occurred event; and an event notifying unit that notifies, when the determining unit determines that the event information of the occurred event is to be transmitted to the target communication device, the target communication device of the event information of the occurred event using a predetermined communication protocol.

According to another aspect of this disclosure, there is provided an event notification method used in an event notification device that is connected to a plurality of communication devices via a network. The event notification device includes a storage unit that stores therein event-transmission determination information including event-type information related to transmission determination information, wherein the event-type information indicates a type of an event, and the transmission determination information indicates whether event information indicative of information about an event is to be transmitted to only at least one target communication device from among communication devices that have requested via the network to be notified of the event information. The event notification method includes monitoring whether an event occurs; determining, when occurrence of an event is detected at the monitoring, whether event information of occurred event is to be transmitted to only the target communication device based on the event-transmission determination information by using event-type information of the occurred event; and notifying, when it is determined at the determining that the event information of the occurred event is to be transmitted to the target communication device, the target communication device of the event information of the occurred event using a predetermined communication protocol.

These aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 4 is an example of a configuration of an application unit, a SOAP/XML processor, a network controller, a storage unit, and an I/F unit in the MFP, that are used for event notification;

FIG. 5 depicts a table structure of an event-request management table according to the embodiment;

FIG. 6 depicts a table structure of a transmission-setting management table according to the embodiment;

FIG. 7 depicts a table structure of an event-transmission determination table according to the embodiment;

FIG. 8 depicts a table structure of a specifically-assigned monitoring-destination list according to the embodiment;

FIG. 9 is an example of a message to be transmitted from a client to the MFP to request a notification of an event;

FIG. 10 is an example of a response message to be transmitted from the MFP

FIG. 11 is an example of a Subscribe message to request an event notification;

FIG. 12 is an example of a Renew message to be transmitted from the client;

FIG. 13 is an example of a response (RenewResponse) message to be transmitted from the MFP to the client in response to the Renew message;

FIG. 14 is an example of a PrinterStatusEventReport message to be transmitted from an event notifying unit;

FIG. 15 is an example of a PrinterJobStatusEventReport message to be transmitted from the event notifying unit;

DETAILED DESCRIPTION OF THE PREFERRED EMBODIMENTS

Exemplary embodiments of the present invention are described below with reference to the accompanying drawings.

As one embodiment of the present invention, there is explained an event notification device that is applied to a multifunction peripheral (MFP) 1 having a copy function, a facsimile (FAX) function, a print function, a scanner function, and a function of distributing an input image (a document image read by a scanner function, and an image input by a printer or a facsimile function).

In the following embodiments, it is explained that the MFP 1 exchanges messages with terminals that use the MFP 1 via a network based on web services (WS)-Eventing. The WS-Eventing is a protocol for registering an event on Web services or notifying the terminals of the event, and is expected to be used by many devices in future. The protocol to be used is not limited to WS-Eventing.

The following description is present in WS-DeviceProfile referring to the WS-Eventing: "A filter in this dialect evaluates to true for an output message of a Notification or Solicit-Response operation if and only if a URI in the filter matches the [action] property of the message". According to this specification, when the type of the event matches, notification is performed on all event monitoring destinations. However, depending on the type of the event (for example, job monitoring), notification is not necessary to be performed on all event monitoring destinations. It is sufficient that an event occurs in only a device that requests the job. The MFP 1 can compensate for this specification. Configurations and processes to compensate for the specification are explained below.

Figure 1:
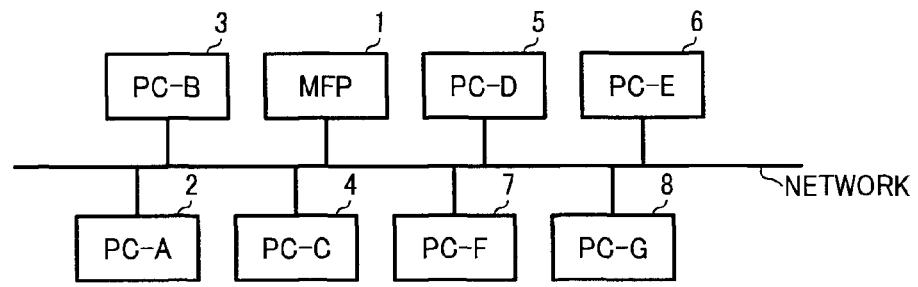
FIG. 1 is one example of a system including an MFP and terminals that use the MFP via a network according to a first embodiment of the present invention.

FIG. 1 is one example of a system including the MFP 1 and terminals that use the MFP 1 via a network according to a first embodiment of the present invention. This system includes a "device" corresponding to the above MFP, and a plurality of personal computers (PC-A 2, PC-B 3, PC-C 4, PC-D 5, PC-E 6, PC-F 7, and PC-G 8) that use the device. While a personal computer usually needs to execute a predetermined procedure to use the MFP 1 via a network, it is assumed that each of these personal computers has already executed the necessary procedure and is in the state of being able to use the MFP 1. Not only the personal computers but also devices having a similar communication function can also use the MFP 1. The communication devices that use the above MFP 1 via the network are hereinafter called clients.

Figure 2:
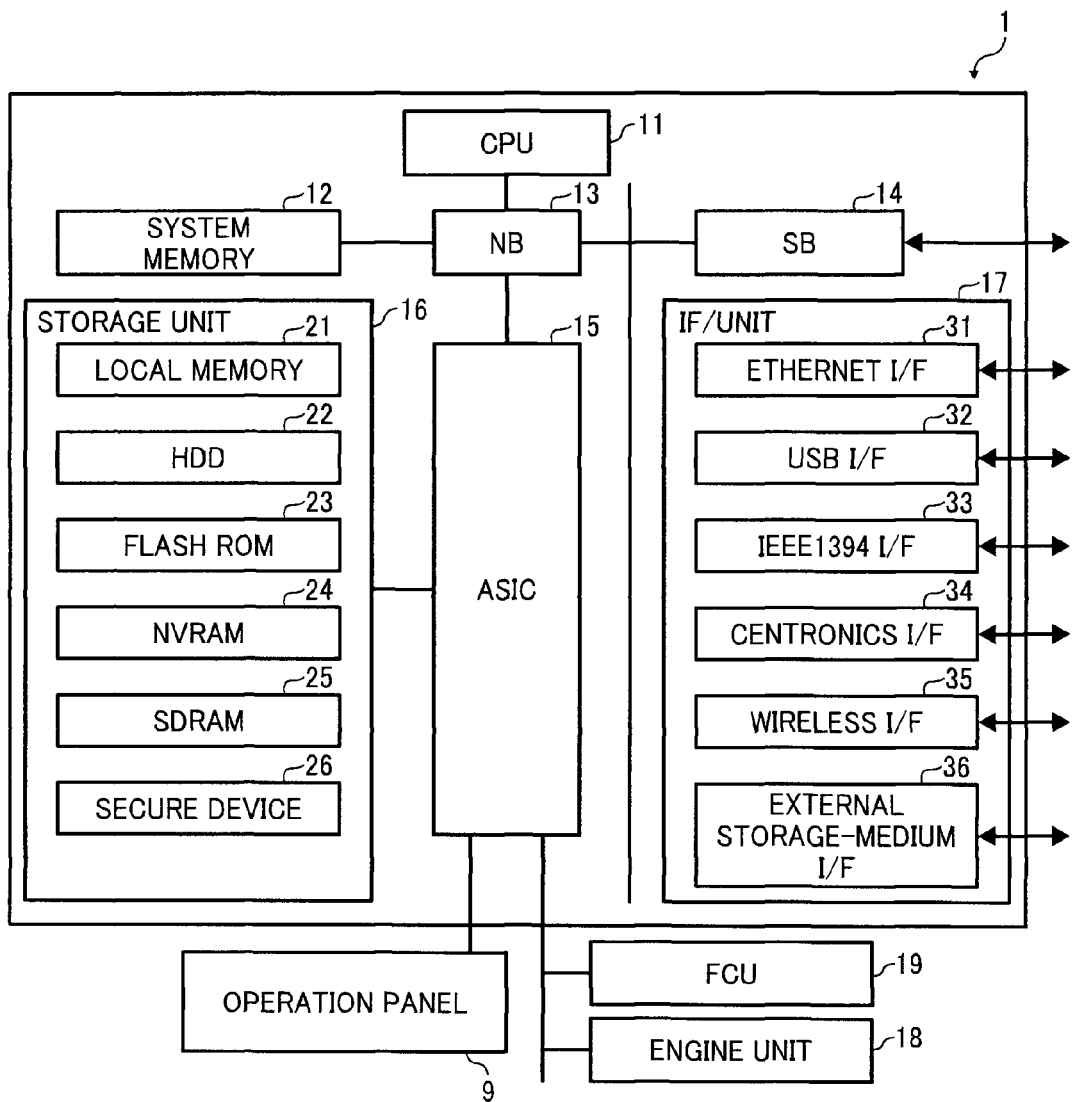
FIG. 2 is an example of a hardware configuration of the MFP shown in FIG. 1.

FIG. 2 is an example of a hardware configuration of the MFP 1. The MFP 1 includes a central processing unit (CPU) 11, a system memory 12, a north bridge (NB) 13, a south bridge (SB) 14, an application-specific integrated circuit (ASIC) 15, a storage unit 16, and an interface (I/F) unit 17.

The CPU 11 controls the MFP 1. The system memory 12 is used to carry out a drawing process. The NB 13 is used to connect between the CPU 11, the system memory 12, the SB 14, the ASIC 15, and the I/F unit 17. The SB 14 is used to connect between the constituent elements shown in FIG. 2 and other constituent elements (such as a read only memory (ROM)) not shown in the drawing. The ASIC 15 is an integrated circuit (IC) for image processing having a hardware element for image processing. The ASIC 15 is connected to an engine unit 18 and a facsimile control unit (FCU) 19.

The storage unit 16 includes a local memory 21, a hard disk drive (HDD) 22, a flash ROM 23, a nonvolatile random-access memory (NVRAM) 24, a synchronous dynamic random-access memory (SDRAM) 25, and a secure device 26, and is used as a storage area of image data and an operation area for image processing.

The I/F unit 17 includes an Ethernet (Trademark) I/F 31, a universal serial bus (USB) I/F 32, an Institute of Electrical and Electronics Engineers (IEEE) 1394 I/F 33, a centronics I/F 34, a wireless I/F 35, and an external storage-medium I/F 36. These interfaces are used for connection to networks such as the Internet and the Intranet and for connection to personal computers. The engine unit 18 includes engines such as a plotter engine, a scanner engine.

Figure 3:
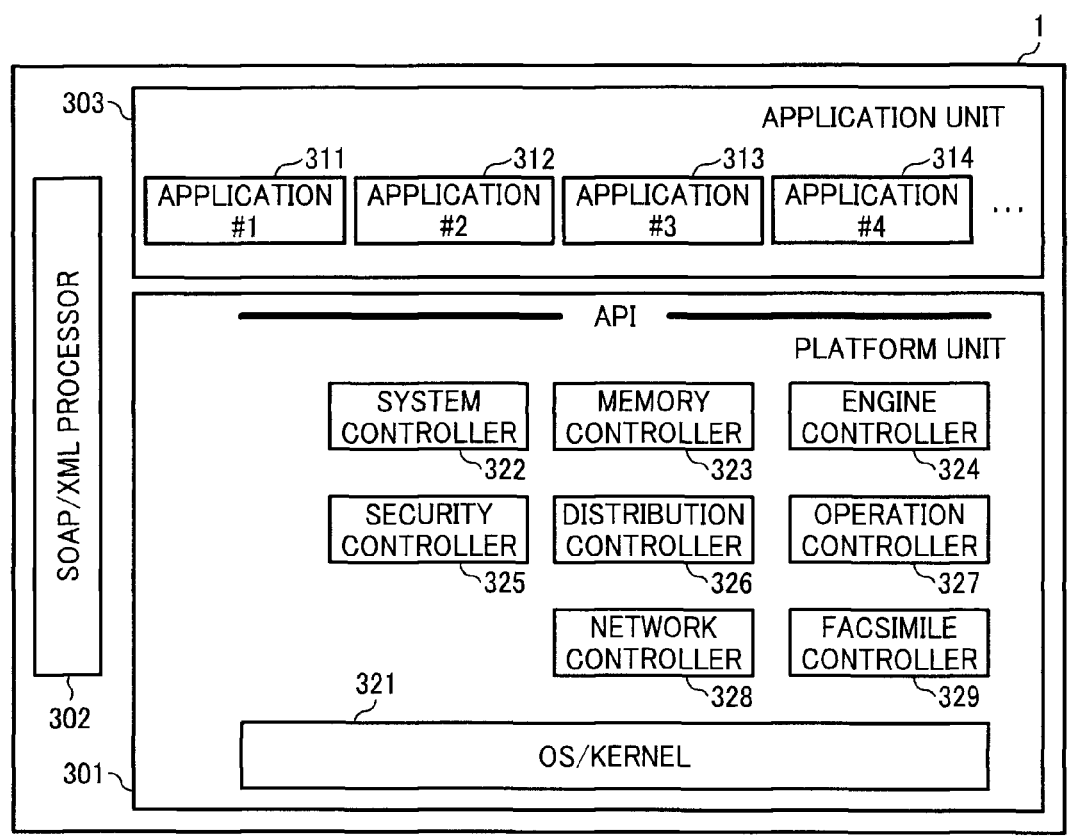
FIG. 3 is an example of a software configuration of the MFP shown in FIG. 1.

FIG. 3 is an exemplary software configuration of the MFP 1. An application unit 303, a platform unit 301, and a Simple Object Access Protocol (SOAP)/Extensible Markup Language (XML) processor 302 constitute software. The CPU 11 shown in FIG. 2 controls these constituent elements. The application unit 303 includes plural application processors (application #1 311, application #2 312, application #3 313, application #4 314, . . . ) that execute processes specific to user services relevant to the image forming process carried out by the printer and the copying machine. The platform unit 301 includes an operating system (OS)/Kernel 321, and various controllers (a system controller 322, a memory controller 323, an engine controller 324, a security controller 325, a distribution controller 326, an operation controller 327, a network controller 328, and a facsimile controller 329 . . . ) that interpret processing requests from the application unit 303 and generate requests for acquiring various kinds of resources such as hardware. The platform unit 301 also has an application program interface (API) that makes it possible to receive the processing requests from the application unit 303 using functions defined in advance. A socket and a network processor are present in the OS/Kernel 321.

The system controller 322 carries out application management and hardware resource management. The memory controller 323 carries out memory control such as obtaining and release of memories. The distribution controller 326 carries out management of data and process of data to transmit and receive data to and from other devices. The network controller 328 is connected to the network interface such as the Ethernet I/F 31 shown in FIG. 1, provides services that can be used in common to applications requiring network input/output (I/O), allocates data received from the network by each protocol to each application, and mediates the transmission of data from each application to the network.

The engine controller 324 controls a plotter engine or the like equipped with the MFP 1. The security controller 325 performs control concerning security such as a login to the MFP 1. The operation controller 327 controls display of an operation panel 9, and an input process about an input that is received through the operation panel 9. The facsimile controller 329 controls the facsimile function of the MFP 1.

The SOAP/XML processor 302 is present in a state of being able to be used by the application unit 303 and the platform unit 301. The SOAP/XML processor 302 encodes/decodes SOAP/XML messages. The SOAL/XML processor 302 is usually provided in the format of a library, and can be also provided in the format of a process.

FIG. 4 is an example of a configuration of the application unit 303, the SOAP/XML processor 302, the network controller 328, the storage unit 16, and the I/F unit 17 that are used for event notification.

The storage unit 16 includes an event-request management table 442 in an arbitrarily storage medium such as the HDD 22, and a transmission-setting management table 443, an event-transmission determination table 441, and a specifically-assigned monitoring-destination list 444, within the NVRAM 24.

FIG. 5 depicts a table structure of the event-request management table 442. As shown in FIG. 5, the event-request management table 442 stores therein IP addresses of an event-request sender (monitoring destinations), requested types of event, and Subscribe IDs, by relating these items to each other. The Subscribe ID is a unique ID allocated to each Subscribe. The event-request management table 442 is added with a record in response to a registration from the client.

The transmission-setting management table 443 manages a setting used to transmit an event when the event occurs. FIG. 6 depicts a table structure of the transmission-setting management table 443. As shown in FIG. 6, the transmission-setting management table 443 includes information about all monitoring destinations or a specific monitoring destination as event notification destinations, information indicating whether to check the number of event requests, a threshold of the number of event Subscribe requests used to check the number of requests, and information indicating whether an event is to be transmitted to a specifically-assigned monitoring destination.

FIG. 7 depicts a table structure of the event-transmission determination table 441. As shown in FIG. 7, the event-transmission determination table 441 manages the type of the event, and information indicating whether an event notification, when an event of the corresponding type occurs, is to be transmitted to a specific monitoring destination, all monitoring destinations, or only specifically-assigned monitoring destination, (hereinafter, also "transmission determination information"). The specifically-assigned monitoring destination is the specific transmission destination assigned by the MFP 1 (assigned by the user).

The specific monitoring destination is the client that requests a job such as PrinterJobStatus or ScannerJobStatus. In the present embodiment, while the type of the event is explained for an example of a rough concept such as PrinterStatus, the type of the event can be also set for each detailed concept such as toner-out and paper-out.

The event-transmission determination table 441 can be also stored in a storage medium other than the NVRAM 24. The above relationships can be also hard-coded on software, instead of being managed on the tables.

FIG. 8 depicts a table structure of the specifically-assigned monitoring-destination list 444. As shown in FIG. 8, the specifically-assigned monitoring-destination list 444 contains a list of specifically-assigned monitoring destinations to which an event occurred needs to be transmitted, when the information indicating whether an event is to be transmitted to a specifically-assigned monitoring destination in the transmission-setting management table 443 in FIG. 6 is set such that the event is to be transmitted to the specifically-assigned monitoring destination.

As described above, various pieces of information are stored in the NVRAM 24. Further, such data stored in the NVRAM 24 are set by the operation controller 327 using the operation panel 9. Alternatively, these data can be set by an external communication device of the client and the like through the network controller 328.

The network controller 328 includes a total controller 411 that controls the total, a WS-Eventing processor 413 that process the WS-Eventing protocol, an event managing unit 414 that manages events, an application communication unit 415 that exchanges various kinds of information (messages and data) with the application unit 303 shown in FIG. 3, a HyperText Transport Protocol (HTTP) controller 416, and a protocol controller 412 that processes various kinds of protocols (for example, the file transfer protocol (FTP), the Port9100, the Line Printer Daemon protocol (LPR)) other than the HTTP.

The WS-Eventing processor 413 performs a process necessary to transmit a message of an event notification following the specification of the WS-Eventing. In generating a message or the like following the specification of the WS-Eventing, the WS-Eventing processor 413 requests the SOAP/XML processor 302 to perform the process. With this arrangement, the message can be transmitted and received based on the WS-Eventing protocol.

The HTTP controller 416 includes a request receiving unit 421, and an event notifying unit 422, and exchanges data, using the HTTP protocol. The request receiving unit 421 receives an event monitoring request from the client. The request receiving unit 421 then registers the received event monitoring request into event-request management table 442.

When the event managing unit 414 detects an event, the event notifying unit 422 notifies a transmission destination of the event, using the HTTP protocol. Generating procedures of a message for determining a destination to be transmitted and of a message working as an event notification are described later.

The event managing unit 414 includes an event monitoring unit 431, a determining unit 432, and a setting unit 433.

The event monitoring unit 431 monitors whether an event occurs in each application of the application unit 303, via the application communication unit 415.

When the event monitoring unit 431 detects the occurrence of an event, the determining unit 432 determines, using the various tables described above, whether the event notification is to be transmitted to a specific monitoring destination or all monitoring destinations. A detailed procedure is described later. The "all monitoring destinations" indicates all IP addresses of event-request senders registered in the event-request management table 442.

The setting unit 433 sets various values to the fields of the transmission-setting management table 443, the event-transmission determination table 441, and the specifically-assigned monitoring-destination list 444, respectively within the NVRAM 24, from the operation panel 9 of the MFP 1, through the operation controller 327. Alternatively, these values can be set from an external device of the client through the network controller 328.

Each application (application #1 311, . . . ) included in the application unit 303 has substantially the same configuration, and includes an application controller 453 that controls the application, an event detector 452 that detects an event, and an information communication unit 451 that exchanges various types of information (messages and data) with each controller constituting the platform unit 301 (that is, each controller included in the event notifying unit).

The event monitoring unit 431 exchanges data with the event detector 452 of each application (application #1 311, . . . ) of the application unit 303, via the application communication unit 415, thereby periodically monitoring whether an event occurs in each application. When the event monitoring unit 431 detects the occurrence of an event in any one of the applications, the determining unit 432 performs a predetermined process, and the event notifying unit 422 notifies each client of this effect. Details of the monitoring operation about the occurrence of an event and details of the event-content notification operation to each client when the event occurs are described later.

A detailed operation of the MFP 1 is explained below. The default operation of the MFP 1, as the operation necessary for each client to receive the notification of the content of the event occurrence from the MFP 1, is explained first. In the present embodiment, each client requests the MFP 1 to be notified about occurrence of the event. In the present embodiment, the WS-Eventing protocol is used as an example.

FIG. 9 is an example of a message from a client to the MFP 1 to request a notification of an event. A Subscribe message requests the event notification. A line 901 in the message indicates that the message is a Subscribe message.

The message shown in FIG. 9 requests the MFP 1 to, when an event specified by the message occurs in the MFP 1, notify the client i.e., the sender of the message, about the content of the event.

Specifically, the line 902 indicates that "when the status of the event represented by the "PrinterStatusEvent" changes (when the event occurs), please notify the sender of this change". When receiving the Subscribe message, the MFP 1 checks whether the MFP 1 can respond to this request content, and the HTTP controller 416 returns a response message of the content based on a result of the check. A value described in the dialect indicated by the line 902 corresponds to the type of the event.

When the MFP 1 receives the Subscribe message, the response message to be transmitted from the MFP 1 is explained. FIG. 10 is an example of a response message to be transmitted from the MFP 1. The MFP 1 transmits to each client a message of the content as shown in FIG. 10 as a response (SubscribeResponse) message to the Subscribe message. The response message shown in FIG. 10 is transmitted when the Subscribe message is properly received. A line 1001 in the message indicates that the message is a SubscribeResponse message.

The response message shown in FIG. 10 indicates that "When an event mentioned in the Subscribe message occurs (or is detected) before a term of validity shown in the Expires field arrives, the sender is notified of this content (occurrence of the event)". During the term of validity shown in the Expires field, when the MFP 1 detects an event mentioned in the Subscribe message, the MFP 1 basically notifies the sender of the SubscribeResponse message of the contents.

FIG. 11 is an example of the Subscribe message to request an event notification. A line 1101 in the message indicates that the message is a Subscribe message. A line (dialect) 1102 indicates that "When the Status of an event represented by "PrinterJobStatusEvent" changes (when the event occurs), please notify the sender of this event". The content (dialect in the filter) shown in FIG. 9 and FIG. 11 can be also described in one Subscribe message.

When a client receiving the above SubscribeResponse message wants to continuously receive the notification of the event after the arrival of the term of validity shown in the received message, the client returns a message of the content shown in FIG. 12 to the MFP 1. FIG. 12 is an example of a Renew message to be transmitted from the client transmits. The message shown in FIG. 12 is usually transmitted when the client receives an event notification from the MFP 1. A line 1201 in the message indicates that the message is a Renew message.

The message shown in FIG. 12 indicates that "Please continuously notify the sender about occurrence of an event, after the arrival of the term of validity (shown in the Expires field contained in the SubscribeResponse message or the like received before)". The client transmits this Renew message before the term of validity set in Expires of SubscribeResponse lapses.

Upon receiving the Renew message, the MFP 1 updates the term of validity in the Subscribe ID assigned by the SubscribeResponse.

Thereafter, the MFP 1 transmits the content shown in FIG. 13, for example, to the client. FIG. 13 is an example of a response (RenewResponse) message to be transmitted from the MFP 1 to the client in response to the Renew message. The response (RenewResponse) message shown in FIG. 13 is transmitted to the client when the Renew message is properly received. A line 1301 in the message indicates that the message is a RenewResponse message.

The message shown in FIG. 13 indicates that "The sender is notified the occurrence (detection) of an event during the term of validity shown in the Expires field". That is, the updated term of validity is shown in the Expires field (a line 1302).

When the MFP 1 detects the occurrence of the event received by the Subscribe message or the Renew message, the event notifying unit 422 notifies the event to the client.

FIG. 14 is an example of a PrinterStatusEventReport message to be transmitted from the event notifying unit 422. The MFP 1 notifies the event that occurs by the time when the term of validity set at the time of receiving these messages arrives, as the PrinterStatusEventReport message. A line 1401 in the message indicates that the message is a PrinterStatusEventReport message.

A line 1402 in the message indicates that the message is a message for notifying that the MFP 1 is out of toner.

As shown in the event-transmission determination table 441 in FIG. 7, PrinterStatus is set as the all monitoring destinations in the transmission determination information. Therefore, regardless of the type of the event, the message shown in FIG. 14 is transmitted to all IP addresses of the event-request senders registered in the event-request management table 442. That is, the MFP 1 receives the SubscribeResponse message or the RenewResponse message from the client, thereby starting the monitoring of the event concerning PrinterStatus. When the event occurs, the message is transmitted to the client that monitors the MFP 1, as well as the client that transmits the message.

Accordingly, all clients who transmit requests can recognize that the MFP 1 is out of toner.

FIG. 15 is an example of a PrinterJobStatusEventReport message to be transmitted from the event notifying unit 422. The MFP 1 notifies the event that occurs by the time when the term of validity set at the time of receiving these messages arrives, as the PrinterJobStatusEventReport message. A line

1501 in the message indicates that the message is a PrinterJobStatusEventReport message.

A line 1502 in the message indicates that the message is a message for notifying that the MFP 1 has completed the job.

As shown in the event-transmission determination table 441 in FIG. 7, PrinterStatus is set as the specific monitoring destination in the transmission determination information. Therefore, the message shown in FIG. 15 is transmitted to the IP address of the event-request sender to which the type of the event is related to "PrinterJobStatus", out of the IP addresses of the event-request senders registered in the event-request management table 442. That is, when the number of received requests is equal to or larger than a threshold, the MFP 1 transmits the messages to the client that transmits the SubscribeResponse message or the RenewResponse message of which the type of the event is "PrinterJobStatus".

Figure 16:
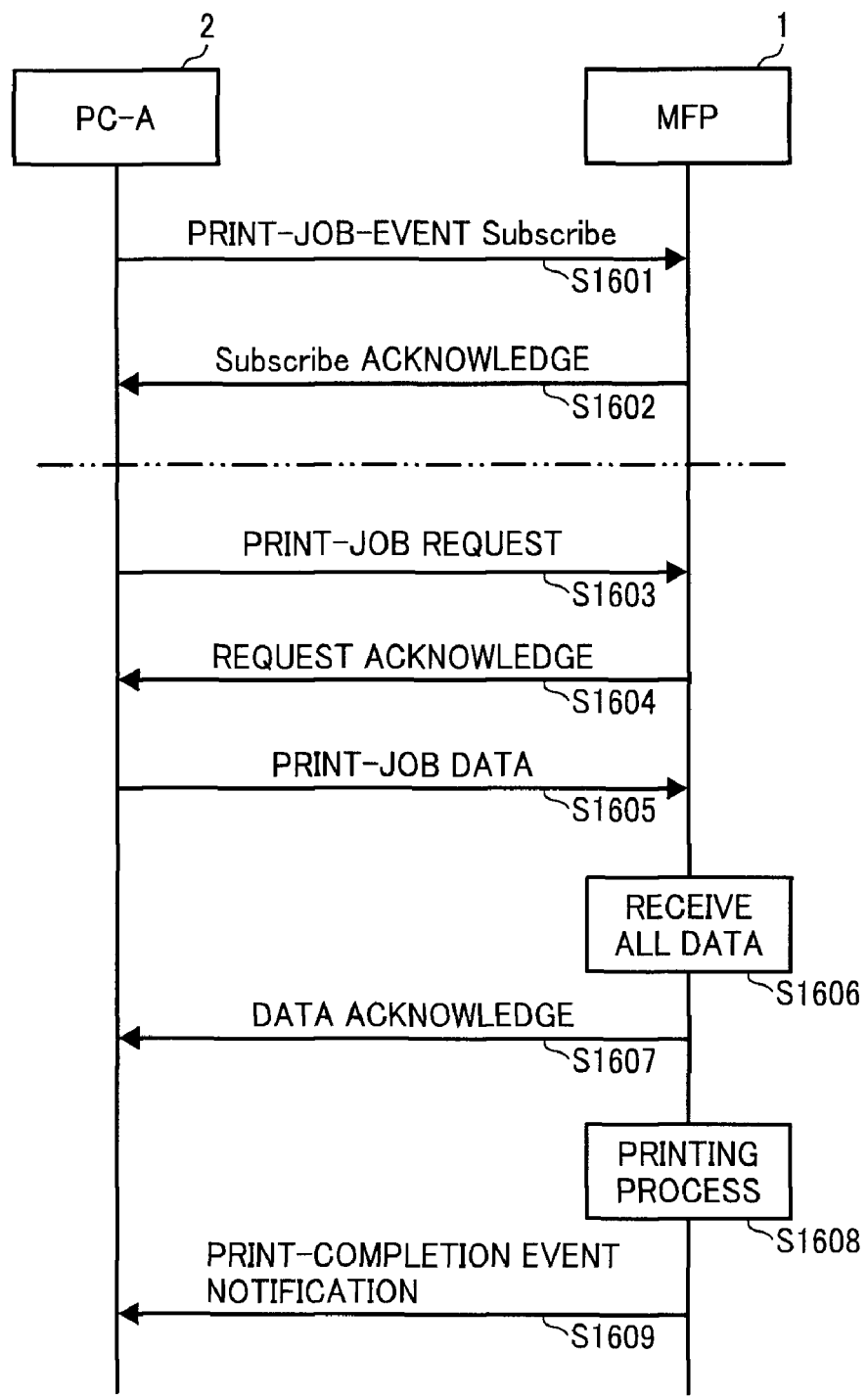
FIG. 16 is a sequence diagram for explaining data transmitted between the MFP and a client as a PC-A, after the MFP receives a monitoring request (Subscribe) of a print-job event until when the MFP notifies the client of a print-completion event.

A process performed between the MFP 1 and the client is explained below. FIG. 16 is a sequence diagram for explaining data transmitted between the MFP 1 and the client as the PC-A 2, after the MFP 1 receives a monitoring request (Subscribe) of a print-job event until when the MFP 1 notifies a print-completion event.

As shown in FIG. 16, the PC-A 2 first transmits to the MFP 1 a print-job event monitoring request (Subscribe) to monitor an event concerning a print job (step S1601). This print-job event monitoring request is as shown in FIG. 11.

When the monitoring request (Subscribe) is properly received, the MFP 1 transmits a response message that the management request (Subscribe) has been received, to the PC-A 2 (step S1602). This response message is as shown in FIG. 10.

The PC-A 2 transmits a print-job request to the MFP 1, to request a printing process (step S1603).

Upon receiving the print-job request, the MFP 1 transmits, if the MFP 1 is in a position to execute the print job, a message that the request has been accepted to the PC-A 2 (step S1604).

Accordingly, the PC-A 2 transmits print-job data to the MFP 1 (step S1605). The MFP 1 receives the transmitted print-job data (step S1606). When all print-job data are received, the MFP 1 transmits a message that the data are all received, to the PC-A 2 (step S1607).

Thereafter, the MFP 1 performs the printing process, based on the received print-job data (step S1608).

The MFP 1 detects the event concerning the print job when the printing process is completed. The MFP 1 notifies a print completing event to the clients including the PC-A 2 that transmits the print-job monitoring request (step S1609).

Figure 17:
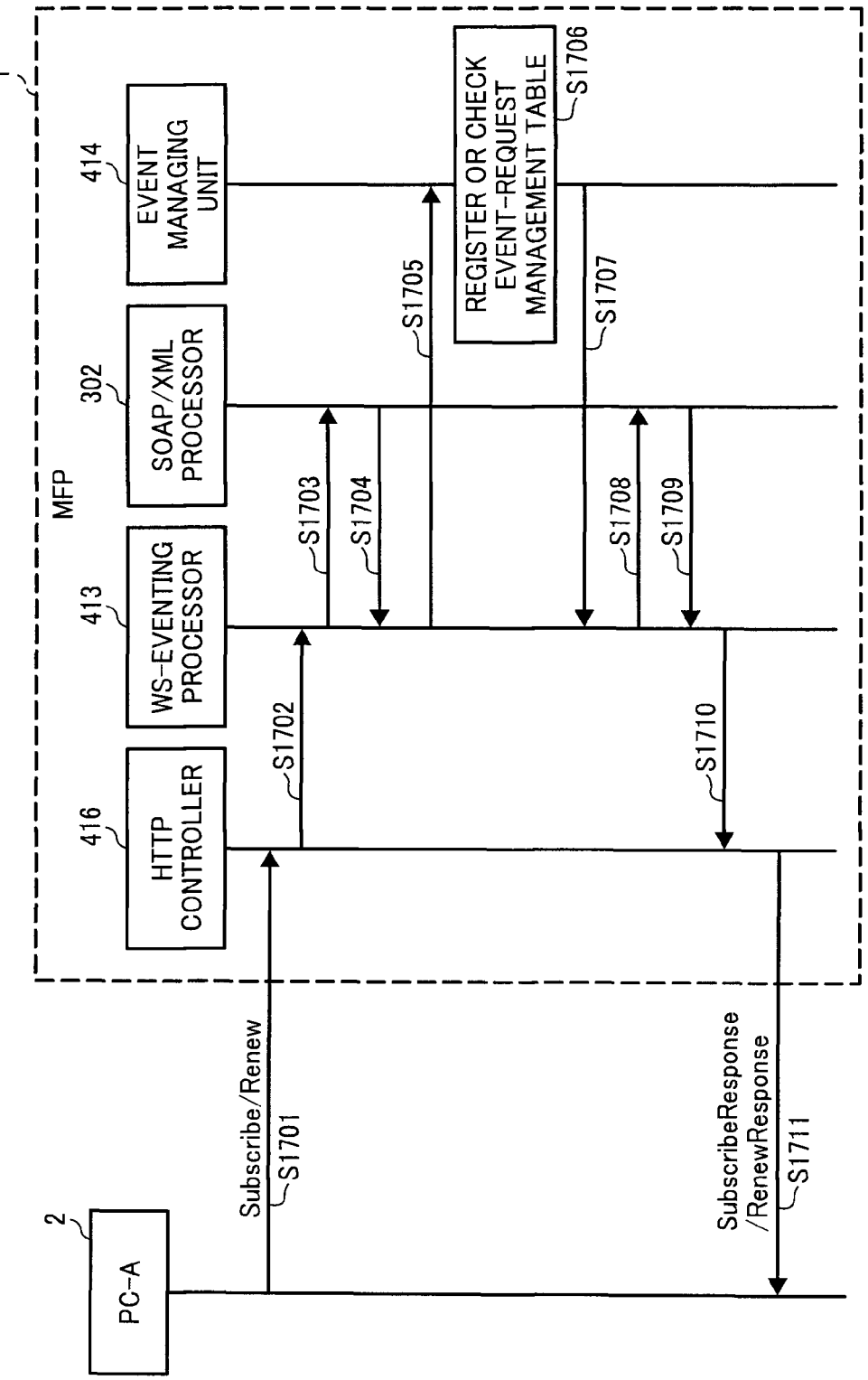
FIG. 17 is a sequence diagram of a process when the MFP receives a Subscribe message or a Renew message from the client.

FIG. 17 is a sequence diagram of a process when the MFP 1 receives a Subscribe message or a Renew message from the client. Although, in the example shown in FIG. 17, the PC-A 2 works as the client, another PC can work as the client.

The MFP 1 receives the Subscribe message or the Renew message from the PC-A 2 (step S1701). In this case, the HTTP controller 416 of the network controller 328 of the MFP 1 outputs the received message to the WS-Eventing processor 413 (step S1702).

The WS-Eventing processor 413 outputs the message to the SOAP/XML processor 302 (step S1703). Accordingly, the SOAP/XML processor 302 analyzes the message. The SOAP/XML processor 302 outputs a result of the content analysis to the WS-Eventing processor 413 (step S1704).

The WS-Eventing processor 413 requests the event managing unit 414 to register the result of the content analysis that is received at step S1704 (step S1705). Accordingly, the event managing unit 414 registers the result of the content analysis into the event-request management table 442 or checks the result in the event-request management table 442 (step S1706).

When it is determined that the request mentioned in the received Subscribe message is acceptable, the event managing unit 414 adds new record information to the event-request management table 442, from among the information contained in the Subscribe message. This added record information indicates to which client the event is to be notified when the event assigned in the Subscribe message occurs. The event-request management table 442 contains a relationship between the type of the event and the client at the transmission destination. The event-request management table 442 can contain a term of validity to perform the above event notification.

When the above process ends, the event managing unit 414 outputs a result of the process to the WS-Eventing processor 413 (step S1707). Thereafter, the WS-Eventing processor 413 requests the SOAP/XML processor 302 to generate, based on the input result of the process, a message (response message) to be transmitted to the client as the transmission destination of the Subscribe message or the Renew message (step S1708).

The SOAP/XML processor 302 generates the response message, based on the result of the process from the WS-Eventing processor 413, and outputs the generated response message to the WS-Eventing processor 413 (step S1709).

The WS-Eventing processor 413 outputs the response message to the HTTP controller 416 (step S1710). As a result, the HTTP controller 416 transmits the response message to the client (step S1711).

The message transmitted from the HTTP controller 416 at step S1711 can vary depending on the content of a message (the Subscribe message or the Renew message) that the MFP 1 receives at step S1701 and a result of the process performed by the event managing unit 414 at step S1706. For example, when the MFP 1 receives the Subscribe message at step S1701, the MFP 1 transmits the SubscribeResponse message at step S1711. When the MFP 1 receives the Renew message at step S1701, the MFP 1 transmits the RenewResponse message at step S1711.

Figure 18:
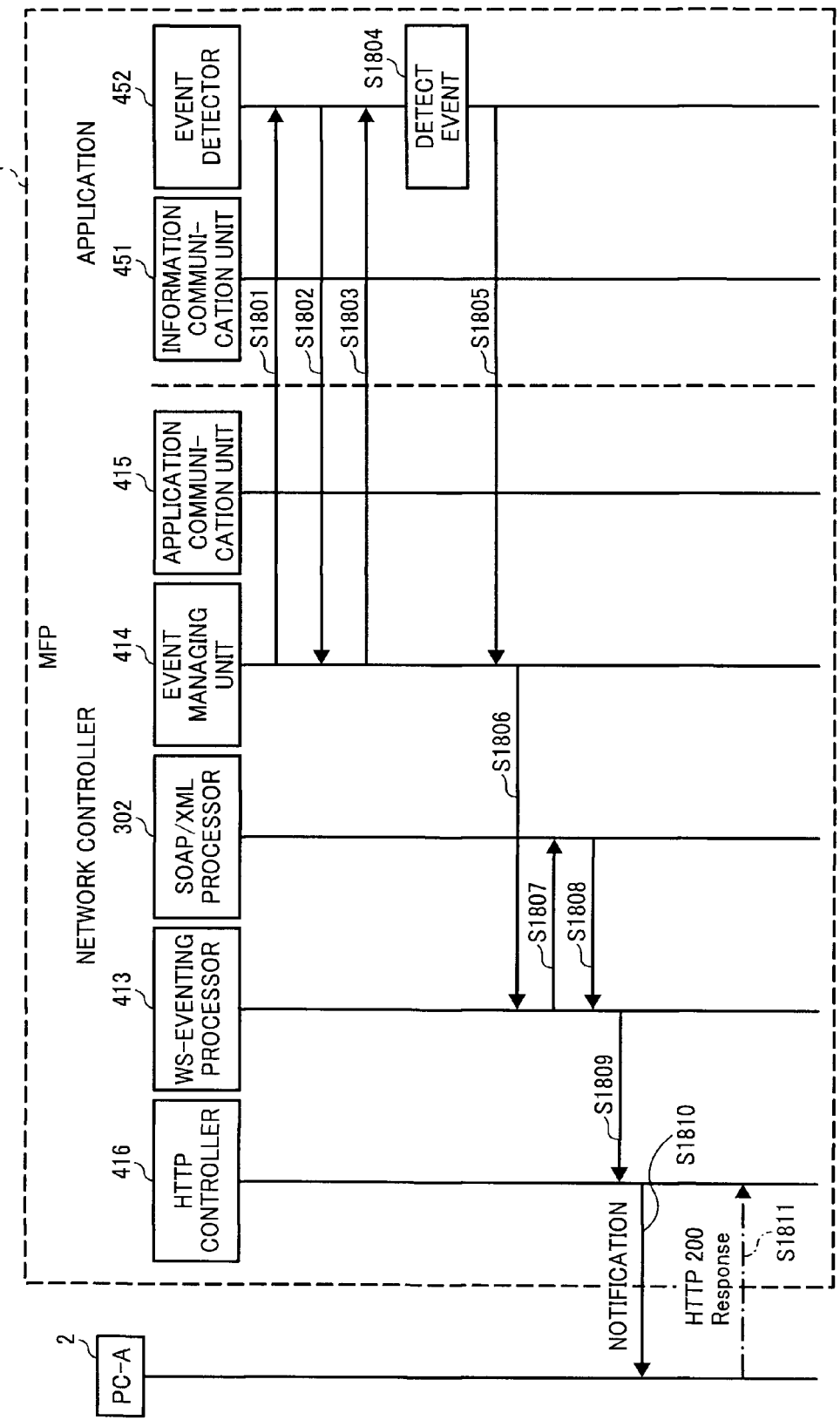
FIG. 18 is a sequence diagram of an exemplary event-occurrence monitoring operation and an exemplary detected-event notification operation performed by the MFP.

FIG. 18 is a sequence diagram of an exemplary event-occurrence monitoring operation and an exemplary detected event notification operation performed by the MFP.

First, the event monitoring unit 431 of the event managing unit 414 stored in the network controller 328 of the MFP 1 periodically monitors whether an event occurs in each application of the application unit 303 (steps S1801, S1803). In the present embodiment, the event monitoring unit 431 enquires the event detector 452 of each application about whether an event has occurred (where a status has changed).

In the example of the procedure shown in FIG. 18, to facilitate the explanation, the event managing unit 414 enquires the event detector 452 of only one application (application #N). However, in the actual situation, the event managing unit 414 enquires all applications of the application unit 303. The event managing unit 414 communicates with the event detector 452 of each application, via the application communication unit 415 and the information communication unit 451.

When no event occurs at the enquiry from the event managing unit 414, the event detector 452 notifies the event managing unit 414 that no event has occurred (step S1802). On the other hand, when the event detector 452 detects occurrence of an event (step S1804), the event detector 452 notifies that the event occurred (step S1805).

When the event monitoring unit 431 receives a notification of the occurrence of an event from the event detector 452, the event managing unit 414 notifies the WS-Eventing processor 413 of occurrence of the event (step S1806). The WS-Eventing processor 413 requests the SOAP/XML processor 302 to generate a message to notify the client of the occurrence of the event to (step S1807).

After the SOAP/XML processor 302 generates a message, the generated message is output to the WS-Eventing processor 413 (step S1808). Thereafter, the WS-Eventing processor 413 outputs the message to the HTTP controller 416 (step S1809).

The event notifying unit 422 of the HTTP controller 416 transmits the message (for example, the PrinterStatusEventReport message shown in FIG. 14 or the PrinterJobStatusEventReport message shown in FIG. 15) that is received from the WS-Eventing processor 413, to the PC-A 2 (step S1810).

The example shown in FIG. 18 is a Notification message for notifying occurrence of an event. Usually, the client (PC-A 2) returns a response message (HTTP 200 Response in the example shown in FIG. 18) in response to the received message (step S1811).

A transmission destination of the message transmitted at step S1810 in FIG. 18 can vary depending on the type of the event. A transmission destination set according to the type of the event is explained below.

Figure 19:
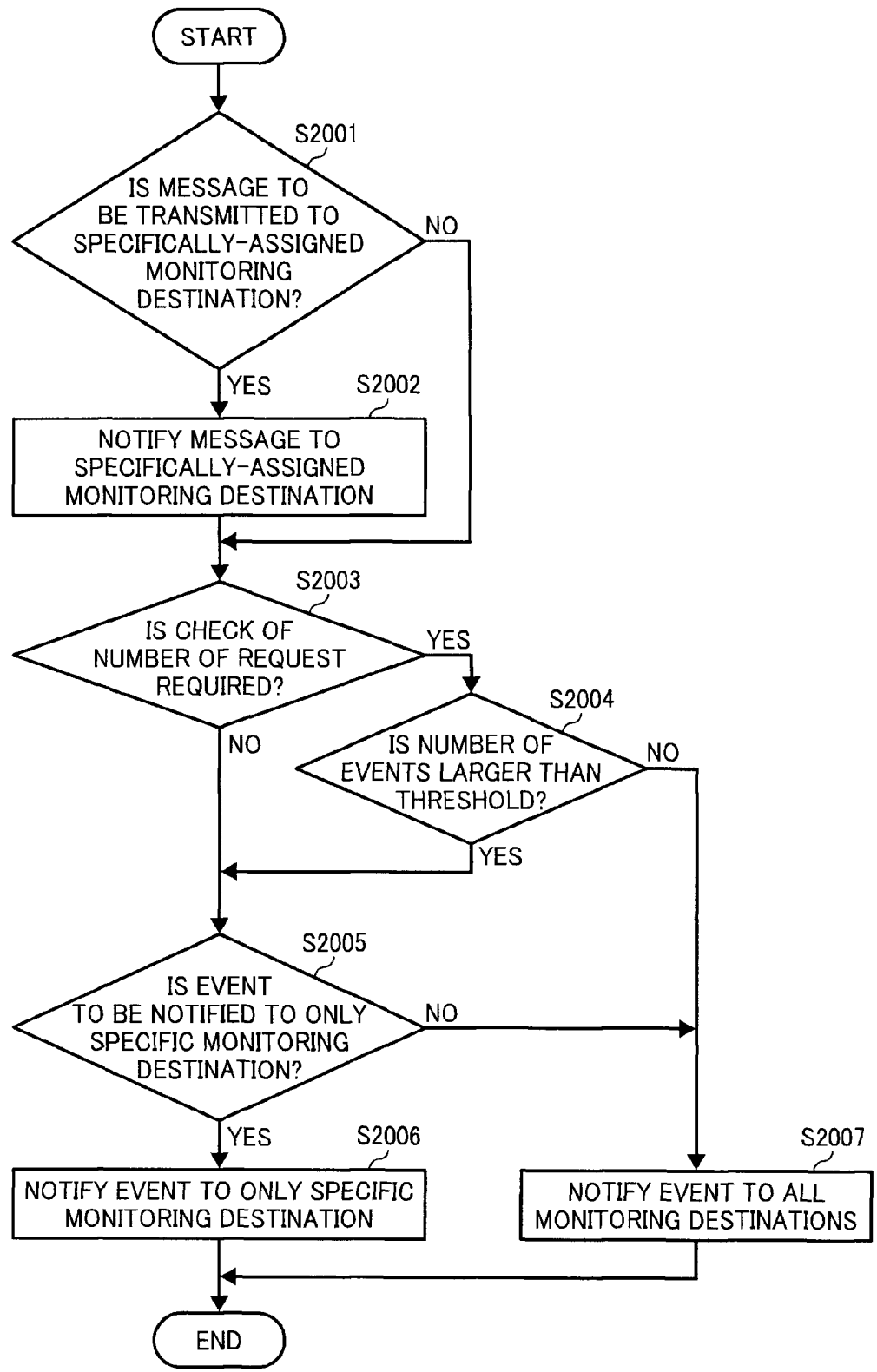
FIG. 19 is a flowchart of an event notification process performed by the event notifying unit according to the embodiment.

FIG. 19 is a flowchart of an event notification process performed by the event notifying unit 422 according to the embodiment. It is assumed that a message to be transmitted is generated in advance.

First, the event notifying unit 422 determines whether the message is to be transmitted to the specifically-assigned monitoring destination by referring to the transmission-setting management table 443 (step S2001). When it is determined that the message is not to be transmitted to the specifically-assigned monitoring destination (NO at step S2001), a process concerning the specifically-assigned monitoring destination is not particularly performed.

When the event notifying unit 422 determines that the message is transmitted to the specifically-assigned monitoring destination (YES at step S2001), the event notifying unit 422 performs notification to the specifically-assigned monitoring destination (step S2002).

The event notifying unit 422 determines whether to check the number of event requests by referring to the transmission-setting management table 443 (step S2003).

When the event notifying unit 422 determines to check the number of requests (YES at step S2003), the event notifying unit 422 determines whether the number of events stored in the event-request management table 442 is larger than a threshold of the number of the event Subscribe requests in the transmission-setting management table (step S2004).

When the event notifying unit 422 determines not to check the number of requests (NO at step S2003) or when the event notifying unit 422 determines that the number of events is larger than the threshold (YES at step S2004), the event notifying unit 422 determines whether the event is to be notified to only the specific monitoring destination from among transmission destinations by referring to the event-transmission determination table 441 using a type of occurred event (step S2005).

When the event notifying unit 422 determines to notify the event to only the specific monitoring destination (YES at step S2005), the event notifying unit 422 notifies the event to only the specific monitoring destination (step S2006). This specific monitoring destination can vary according to a type of the occurred event. It is possible to transmit only to a specific IP address (for example, 192.168.2.56) stored in the event-transmission determination table 441 in FIG. 7, or to only the client that requests the job in the case of the job-related event.

When the event notifying unit 422 determines that the number of events is smaller than the threshold (NO at step S2004) or when the event notifying unit 422 determines that only the specific monitoring destination is not to be notified of the event (NO at step S2005), the event notifying unit 422 notifies all monitoring destinations of the event (step S2007).

The MFP 1 can notify only a specific event monitoring destination of an occurred event according to the type of the occurred event. The MFP 1 can also set whether to notify the event to only a specific event monitoring destination or to all event monitoring destinations. The event notification can be controlled according to the number of event monitoring requests. The MFP 1 can be configured in such a manner that a specific monitoring destination is notified of any event without exception.

By performing the above process, the MFP 1 notifies the event to a client to whom the event needs to be notified, and does not notify the event to a client to whom the event does not need to be notified. Therefore, the processing load can be decreased, and the occurrence of a delay in the event notification can be prevented.

The MFP 1 according to the present embodiment receives an event monitoring request from a client (event monitoring destination), and monitors the occurrence of an event following the request. When an event occurs and at the time of notifying the event to the client, the MFP 1 changes over between whether the event notification is to be transmitted to a specific monitoring destination or the event notification is to be transmitted to all monitoring destinations, based on the type of the occurred event. With this arrangement, the event can be notified to a monitoring destination to which the event needs to be notified, and an unnecessary event notification is not performed. Accordingly, transmission of an unnecessary packet can be suppressed.

By changing the record information of the event-transmission determination table, the event notification destination related to the type of the event can be changed to either a specific event monitoring destination or to all event monitoring destinations. Therefore, a notification destination can be customized according to a request of the user.

By changing the record information in the transmission-setting management table 443 or the event-transmission determination table 441 in the MFP 1, all event monitoring destinations can be set to be able to monitor all events of the device, and an unnecessary packet can be set not to be transmitted.

By changing the number of requests of the transmission-setting management table 443, the number of event notifications can be customized. Accordingly, the number of transmission destinations can be suitably set by considering the processing load applied to the MFP 1 and the network.

By setting the IP address to a specifically-assigned monitoring destination in advance, all events can be notified to a management personal computer (PC) and the like without fail. In this way, items can be variously customized according to the request of the user.

An event notification program to be executed by the MFP 1 according to the present embodiment is provided by being stored in a ROM or the like beforehand.

The event notification program can be provided by being recorded onto a computer-readable recording medium such as a compact-disk read only memory (CD-ROM), a flexible disk (FD), a compact disk recordable (CD-R), and a digital versatile disk (DVD), in an installable format or an executable format.

The event notification program can be stored in a computer connected to a network such as the Internet, and the event notification program can be provided by downloading from the network. The event notification program executed by the MFP 1 can be also provided or distributed via a network such as the Internet.

The event notification program is made up of modules that implement each unit included in the network controller 328. As actual hardware, a CPU reads and executes the event notification program from the above ROM, thereby loading each unit onto the main storage device, and generating each unit included in the network controller 328 onto the main storage unit.

According to an embodiment of the present invention, because an event is transmitted to only a predetermined event transmission destination, processing load to perform the notification can be decreased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An event notification device connected to a plurality of communication devices via a network, the event notification device comprising:
   a first storage unit that stores therein event-transmission determination information including event-type information related to transmission determination information, wherein the event-type information indicates a type of an event, and the transmission determination information indicates whether event information indicative of information about an event is to be transmitted to only at least one target communication device from among communication devices that have requested via the network to be notified of the event information;
   an event monitoring unit that monitors whether an event occurs;
   a determining unit that determines, when the event monitoring unit detects occurrence of an event, whether event information of occurred event is to be transmitted to only the target communication device based on the event-transmission determination information by using event-type information of the occurred event;
   an event notifying unit that notifies, when the determining unit determines that the event information of the occurred event is to be transmitted to the target communication device, the target communication device of the event information of the occurred event using a predetermined communication protocol; and
   a receiving unit that receives from a communication device connected to the event notification device via the network an event monitoring request that requests the event notification device to transmit event information at occurrence of an event, wherein
   the determining unit determines whether the event information is to be transmitted to only the target communication device or to be transmitted to all the communication devices that have transmitted the event monitoring request to the receiving unit, and
   the determining unit determines that the event information is to be transmitted to only the target communication device when the, event-type information in the event-transmission determination information indicates the event information is to be transmitted only to the target communication device, and number of event monitoring requests received by the receiving unit is a threshold or larger.

2. The event notification on device according to claim 1, wherein when the determining unit determines that the event information of the occurred event is not to be transmitted to only the target communication device, the event notifying unit notifies of the event information of the occurred event to all the communication devices that have requested to be notified of the event information.

3. The event notification device according to claim 1, further comprising a storing unit that stores the transmission determination information in the first storage.

4. The event notification device according to claim 1, further comprising a second storage unit that stores therein an address of the target communication device, wherein
   the event notifying unit notifies the target communication device of the event information using the predetermined communication protocol, regardless of a result of determination made by the determining unit.

5. The event notification device according to claim 1, wherein the event notifying unit uses a web services eventing protocol as the predetermined communication protocol.

6. An event notification method used in an event notification device that is connected to a plurality of communication devices via a network and includes a storage unit that stores therein event-transmission determination information including event-type information related to transmission determination information, wherein the event-type information indicates a type of an event, and the transmission determination information indicates whether event information indicative of information about an event is to be transmitted to only at least one target communication device from among communication devices that have requested via the network to be notified of the event information, the event notification method comprising:
   monitoring whether an event occurs;
   determining, when occurrence of an event is detected at the monitoring, whether event information of occurred event is to be transmitted to only the target communication device based on the event-transmission determination information by using event-type information of the occurred event;
   notifying, when it is determined at the determining that the event information of the occurred event is to be transmitted to the target communication device, the target communication device of the event information of the occurred event using a predetermined communication protocol; and
   receiving from a communication device connected to the event notification device via the network an event monitoring request that requests the event notification device to transmit event information at occurrence of an event, wherein
   the determining includes determining whether the event information is to be transmitted to only the target communication device or to be transmitted to all the communication devices that have transmitted the event monitoring request to the receiving unit,
   the determining includes determining that the event information is to be transmitted to only the target communication device when the event-type information in the event-transmission determination information indicates the event information is to be transmitted only to the target communication device, and number of event monitoring requests received at the receiving is a threshold or larger.

7. The event notification method according to claim 6, wherein when it is determined at the determining that the event information of the occurred event is not to be transmitted to only the target communication device, the notifying includes notifying of the event information of the occurred event to all the communication devices that have requested to be notified of the event information.

8. The event notification method according to claim 6, wherein the notifying includes using a web services eventing protocol as the predetermined communication protocol.

* * * * *